United States Patent [19]

Terrill et al.

[11] 4,285,368
[45] Aug. 25, 1981

[54] PIPELINE STOPPER AND PIPE FITTING

[75] Inventors: Garrett D. Terrill; Lynn D. Edwards, both of Decatur, Ill.

[73] Assignee: Mueller Co., Decatur, Ill.

[21] Appl. No.: 819,621

[22] Filed: Jul. 27, 1977

[51] Int. Cl.³ .............................................. F16L 55/12
[52] U.S. Cl. ....................................................... 138/89
[58] Field of Search .................... 138/94, 97, 98, 99, 138/30, 90, 89; 251/194; 137/317

[56] References Cited

U.S. PATENT DOCUMENTS

| | | | |
|---|---|---|---|
| 3,155,369 | 11/1964 | Wright et al. | 138/94 |
| 3,543,802 | 12/1970 | Leopold et al. | 138/94 |
| 3,640,172 | 2/1972 | Mercier | 138/30 |

*Primary Examiner*—Lenard A. Footland
*Attorney, Agent, or Firm*—Cushman, Darby & Cushman

[57] ABSTRACT

A pipeline stopper assembly of the expanding sleeve type for use in large diameter pipes having a transverse circular cut-out or opening therethrough. The pipeline stopper assembly cooperates with a stopper fitting secured to the pipeline so that when the assembly is inserted into the transverse opening in the pipeline and is properly oriented with the space between the split sleeve facing in the proper direction, it incapable of being rotated within the opening. The torque encountered in the expanding of the sleeve by the actuating means is transferred directly from the operating nut members to the sleeve without being transferred through the toggle arms. Stop means are provided which limit movement of the operating nut members toward each other and, thus, positively limit the amount of expansion of the sleeve and the pivotal movement of the arms to an angle no greater than 90° to the longitudinal axis of the stopper assembly. By providing stop means coacting directly with the nut members, no unnecessary loads are transferred to the toggle arms or their pivots and this coupled with the elimination of torque from the toggle arms enables the arms and their pivots to be made of a lighter and cheaper material.

17 Claims, 3 Drawing Figures

PIPELINE STOPPER AND PIPE FITTING

The present invention relates to pipeline stopper assemblies of the expanding sleeve type arranged to be inserted into a transverse circular cut-out portion or opening in a large diameter pipe and expanding to stop the flow of fluid therethrough. More particularly, the present invention relates to an improvement in construction of a pipeline stopper assembly of the type disclosed in U.S. Pat. No. 3,543,802, Leopold, Jr., et al, issued Dec. 1, 1970 and U.S. Pat. No. 3,405,739, John J. Smith, issued Oct. 15, 1968, both of said patents being assigned to the same assignee as this application.

BACKGROUND OF THE INVENTION

In prior pipeline stopper assemblies of the character disclosed in the aforementioned U.S. Pat. No. 3,543,802, the assembly utilized sets of angularly spaced toggle arms connected between a cylindrical longitudinally split expanding sleeve and members movable coaxially of the sleeve. The members were threadedly engaged with a jackscrew and rotation of the jackscrew effected movement of the members toward one another to expand the sleeve or away from one another to contract the sleeve. Stop means were provided to limit the movement of the toggle arms so that their pivotal movement was merely to an angle no greater than 90° to the longitudinal axis of the stopper assembly thereby ensuring positioning and proper operation for a particular size stopper assembly when used with a particular size pipeline. However, these stop means engaged the toggle arms directly and continued actuation of the jackscrew could place undesirable stresses or loads on the toggle arms and their pivots possibly damaging the same and resulting in an inoperative stopper assembly or possibly damaging the seating surface of the cylindrical split sleeve.

In previous stopper assemblies, the split sleeve was held from rotating by the use of a second shaft on the stopping machine and while this resulted more mechanism being incorporated into the stopping machine, it also did not ensure proper positioning of the stopper assembly in the transverse opening through a pipeline.

With the advent of the use of large diameter pipes of 20 inches, 30 inches and more, the prior art pipeline stopper assemblies had to be constructed considerably larger in size to accommodate the increased size of the transverse openings required for such large diameter pipelines. By utilizing a pipeline stopper design of the type disclosed in the aforementioned U.S. Pat. No. 3,543,802, there was a great weight sacrifice necessary to make the toggle arms stiff and strong enough to resist the torque transferred from the jackscrew through the operating nuts to the toggle arms and to the longitudinally split sleeve. While the toggle arms had to not only be increased in size, their pivots to the operating nut members and to the sleeve member also had to be increased in size and weight to provide the necessary strength required because of increasing loads and torques. The only other solution to the problem created by designing larger pipeline stopper assemblies was to use expensive and exotic high strength metals capable of transferring the torques and loads through the toggle arms from the operating nut members to the longitudinally split sleeve but this solution was impracticable because of the expenses involved in the manufacture of such units.

PRIOR ART

Prior art on this subject is represented by the following patents which disclose pipeline stopper assemblies and/or pipeline stopper inserting and extracting machines:

| U.S. Pat. No. | Inventor | Issued |
|---|---|---|
| 8,543,802 | Leopold, Jr., et al | December 1, 1970 |
| 3,405,739 | Smith | October 15, 1960 |
| 3,155,369 | Wright et al | November 3, 1964 |
| 3,046,645 | Smith | July 31, 1962 |
| 2,655,339 | Smith | October 13, 1953 |

The pipeline stopper insertion machine patents listed above are disclosed for the purpose of background in an understanding of the present invention and its operation whereas the pipeline stopper assembly patents represent prior art patents on pipeline stopper assemblies but none of the same disclose such assemblies wherein the stopper assembly is oriented positively upon insertion and prevented positively from rotating. Further, none of the stopper assembly patents disclose transferring the torque from the operating nut members to the sleeve directly without transfer through the toggle arms nor do these patents disclose stop means which function directly with the operating nut members to prevent over-travel of the operating nut members by the jackscrew and to further limit the expansion of the sleeve member to a maximum diameter when the toggle arms are at 90° to the axis of the stopper assembly.

BRIEF SUMMARY OF THE INVENTION

In its basic form, the present invention relates to an improvement in a pipeline stopper assembly for insertion into a transverse opening in a pipeline of a large diameter. The invention comprises a stopper fitting adapted to be secured around a pipeline, the fitting having a generally tubular portion extending transverse to the axis of the pipeline and through which a transverse circular opening is made in the pipeline. The stopper fitting has at least one and preferably two inwardly extending lugs adjacent one end thereof and positioned exterior of the transverse circular opening through the pipeline. A cylindrical stopper assembly is adapted to be inserted into the transverse circular opening, the stopper assembly comprising a longitudinally split expandable and contractible cylindrical sleeve having a gasket material on at least a portion of its outer surface. A notch provided in the lower edge of the sleeve receives the at least one lug to support, properly orient and prevent rotation of the sleeve with respect to the stopper fitting and when there are two lugs, the other lug is positioned in the split in the sleeve. Means are provided to expand the sleeve into sealing engagement with the opening in the pipeline and to contract the sleeve out of such engagement, the means including a plurality of angularly spaced longitudinally extending bars secured to the inner surface of the sleeve with each of the bars having a slot adjacent each end, a jackscrew, a pair of members threadedly connected to the jackscrew for movement toward and away from each other, a first set of angularly spaced toggle arms pivotally connected to one of the members and to said bars in the slots adjacent one end of the same and a second set of angularly spaced toggle arms pivotally connected to the other of said members and to said bars in the slots at the other end of the same. Stop means are carried by one of said members for engaging the other of said members to thereby limit movement of said members toward each other and limit pivotal movement of said arms to an angle no greater than 90° to the longitudinal axis of said jackscrew. Means are provided for transferring the torque from the members during operation directly to the longitudinally extending bars and said cylindrical sleeve without torque being transferred through the toggle arms.

Another aspect of the invention is to provide a stopper fitting secured around a pipeline, said fitting having a generally tubular portion extending transverse to the axis of the pipeline and through which a transverse circular opening is made in the pipeline, the fitting having at least one but preferably two inwardly extending lugs adjacent one end thereof and positioned exterior of the transverse circular opening through the pipeline. A cylindrical stopper assembly is adapted to be inserted into the transverse circular opening of the pipeline, and it includes a longitudinally split expandable and contractible cylindrical sleeve having a gasket material on at least a portion of its outer surface, the at least one lug on the stopper fitting being received in a notch in the sleeve to support, properly orient and prevent rotation of the sleeve with respect to said stopper fitting. If there are two lugs, the other lug will be received in the longitudinal space between the split cylindrical sleeve. Means are provided on the stopper assembly for expanding said split cylindrical sleeve into sealing engagement with edges of the transverse circular openings through the pipeline.

A still further aspect of the present invention is to provide a cylindrical pipe stopper assembly adapted to be inserted into a transverse opening in a pipeline, the assembly comprising a longitudinally split cylindrical sleeve for insertion into the transverse opening through the pipeline, the sleeve being positioned to positively expand into sealing engagement with the edges of the opening and positively contracted out of sealing engagement by actuating means which include a member mounted for movement coaxially of the sleeve, a jackscrew threadedly engaged with the member for executing movement of the same and at least a pair of angularly spaced longitudinally extending bars secured to the inner surface of the longitudinally split cylindrical sleeve, each of the bars having a slot therein. At least a pair of angularly spaced toggle arms are each pivotally connected to one of said bars in the slot therein and to the member, and means are provided for transferring torque from the member during operation of the same directly to the longitudinally extending bars and the cylindrical sleeve without the torque being transferred through the toggle arms.

A further feature of the invention is to provide a cylindrical stopper assembly adapted to be inserted into and having a minimum outer diameter less than a transverse circular opening through a pipeline and adapted to be expanded into sealing engagement with the edges of the opening, the cylindrical pipe stopper assembly comprising a longitudinally split cylindrical sleeve having a gasket material on at least a portion of its outer surface and the sleeve further having a plurality of angularly spaced longitudinally extending bars secured to its inner surface and each of said bars having a slot adjacent each end thereof. An elongated jackscrew threadedly receives a pair of members arranged for movement toward and away from each other. A first set of angularly spaced toggle arms are pivotally connected to one of said members and to said bars in said slots adjacent one end of the same, and a second set of angularly spaced toggle arms are pivotally connected to the other of said members to said bars whereby movement of the member toward and away from each other respectively expand and contract said sleeve. Stop means are carried by one of the members to thereby limit movement of said members toward each other and limit pivotal movement of said arms to an angle no greater than 90° to the longitudinal axis of the jackscrew.

DETAILED DESCRIPTION OF THE INVENTION

Figure 1:
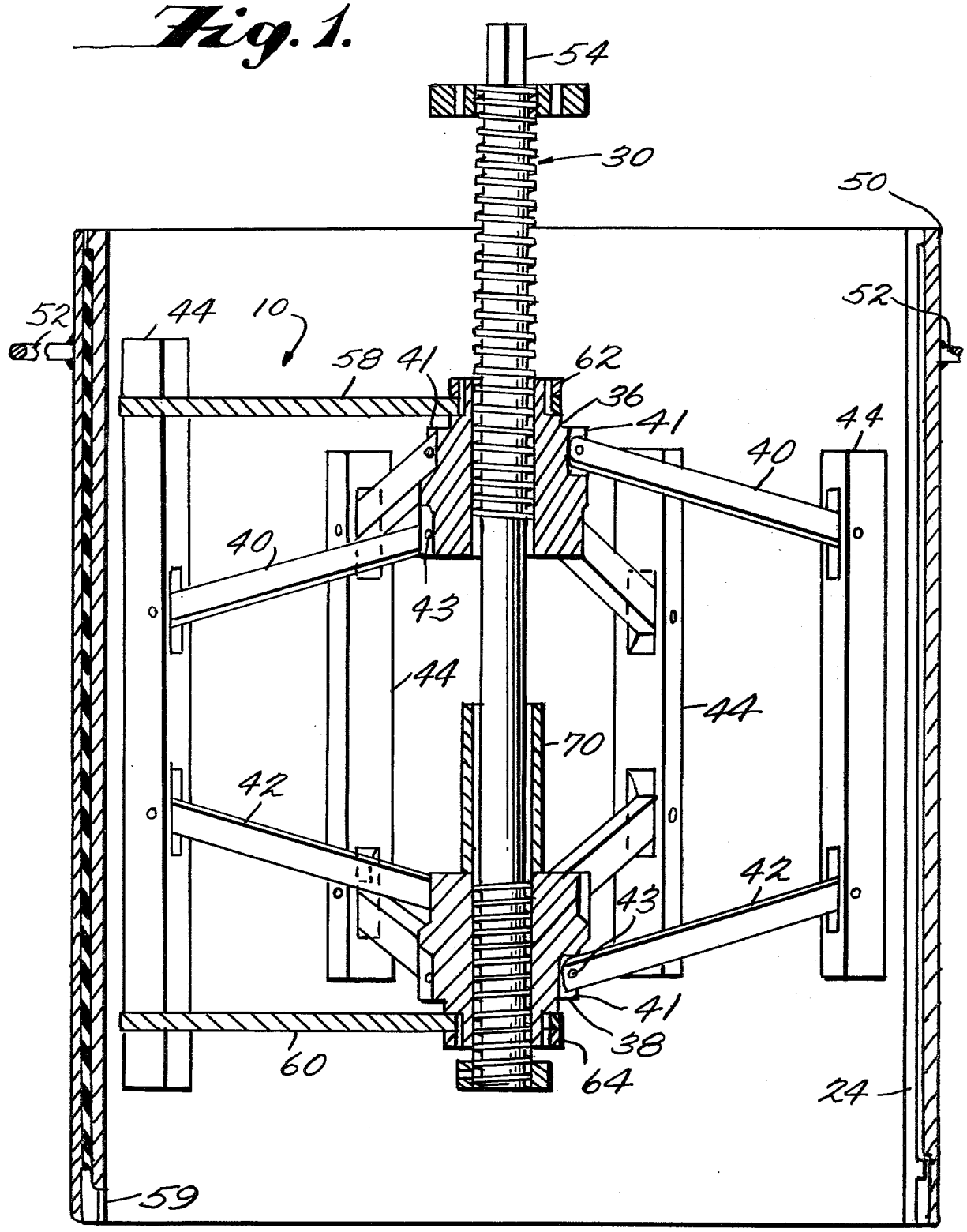
FIG. 1 is a vertical sectional view of a pipeline stopper assembly embodying the improvements of the present invention, the stopper assembly being shown in its inoperative contracted position and stored in a protective sleeve for transportation.

Referring now to the drawings wherein like characters or reference numerals represent like or similar parts, the pipeline stopper assembly of the present invention is generally designated by the numeral 10 and is of the expanding sleeve type adapted to be inserted into a transverse opening 12 (FIGS. 2 and 3) in a pipeline P for a fluid distribution system such as water, gas or the like. As is well known in the art, when it is desired to provide a stopper assembly to shut-off the flow of fluid in the pipeline or main P, a stopper fitting 14 is welded or otherwise suitably secured to the pipeline, the fitting being provided with a tubular portion 16 having an axis extending transverse to the axis of the pipeline P. The fitting 14 is provided with a mouth portion 18 to which a suitable drilling and stopper machine, schematically shown in broken lines, at 20 is secured. By known methods, the pipeline P is cut away to provide the transverse circular opening 12 therethrough within the tubular portion 16 of the stopper fitting 14. Once the opening 12 has been provided in the pipeline P, the stopper assembly 10 is then inserted into the opening and expanded into sealing engagement with the edges thereof to provide for blockage of flow of fluid through the pipeline P.

The pipeline stopper assembly 10 includes a split cylindrical sleeve 22 having a longitudinal slot 24 between its ends. Sleeve 22 is preferably constructed of a springy material such as sheet metal or the like and the outer surface of the sleeve 22 is provided on at least a portion thereof with a flexible or resilient cover 26 made of rubber or other suitable elastomeric gasket material capable of engaging with the cut-out portion or opening 12 of the pipeline P so as to provide a seal therewith. Additionally, the outer surface of sleeve 22 may be provided with a pair of elongated longitudinally extending wear strips 28 made of steel or the like, the purpose of the wear strips being fully disclosed in the U.S. Pat. No. 3,405,739 to Smith.

Coaxially disposed within the sleeve 22 of the stopper assembly 10 is a jackscrew 30 having two sets of threads 32 and 34 of opposite direction on which are respectively threadedly mounted operating nut members 36 and 38. The nut members 36 and 38 move in opposite directions upon rotation of the jackscrew 30 by the stopper inserting machine 20. Nut members 36 and 38 are each provided with a set of equal length, generally radially extending, and substantially uniformly angularly spaced toggle arms 40 and 42, the number of arms in each set depending on the size of the stopper assembly 10. The nut members 36 and 38 are provided with slots 41 for receiving the ends of the sets of arms 40 and 42, the slots having pivot pins extending therethrough and in which the respective arms of the sets of arms 40 and 42 may freely pivot on pivot pins in a restrained movement in a single plane.

The interior surface of the sleeve 22 has welded or otherwise suitably secured thereto a plurality of elongated longitudinally extending bars 44, there being the same number of bars as arms in a set of toggle arms. The bars 44 are angularly spaced and each bar is provided adjacent its ends with radially extending vertically spaced apart slots 46 for receiving the opposite ends of the arms 40 and 42 on pivot pins 48, the pivot pins being supported in suitable holes through the bars. As will now be appreciated, the stopper assembly 10 thus far described is somewhat similar to that disclosed in the aforementioned Leopold, Jr. U.S. Pat. No. 3,543,802 and to that extent, the subject matter of this patent is incorporated by reference herein.

Referring now to FIG. 1, the stopper assembly 10 of the present invention is illustrated in at least a partially contracted position, the stopper assembly being shown stored in a protective sleeve 50 used in the transportation of the stopper assembly from the manufacturers plant to a place of use. The protective sleeve 50 is a cylindrical sleeve made of plastic or metal and provided with a pair of radially outwardly extending carrying handles 52. The stopper assembly 10 is inserted into the protective sleeve 50 in its fully contracted position and then is partially expanded until the sleeve 22 of the stopper assembly 10 tightly engages the interior wall of the protective sleeve 50 and then the stopper assembly may be suitably transferred to its point of use without danger of damage to its operating mechanism or its gasket cover 26. At the point of use, the stopper assembly 10 is then contracted so that it may be removed from the sleeve 50 and the upper end of 54 of the jackscrew 30 is suitably attached to the stopper insertion machine 20 for inserting into the opening 12 of the pipeline P.

Figure 2:
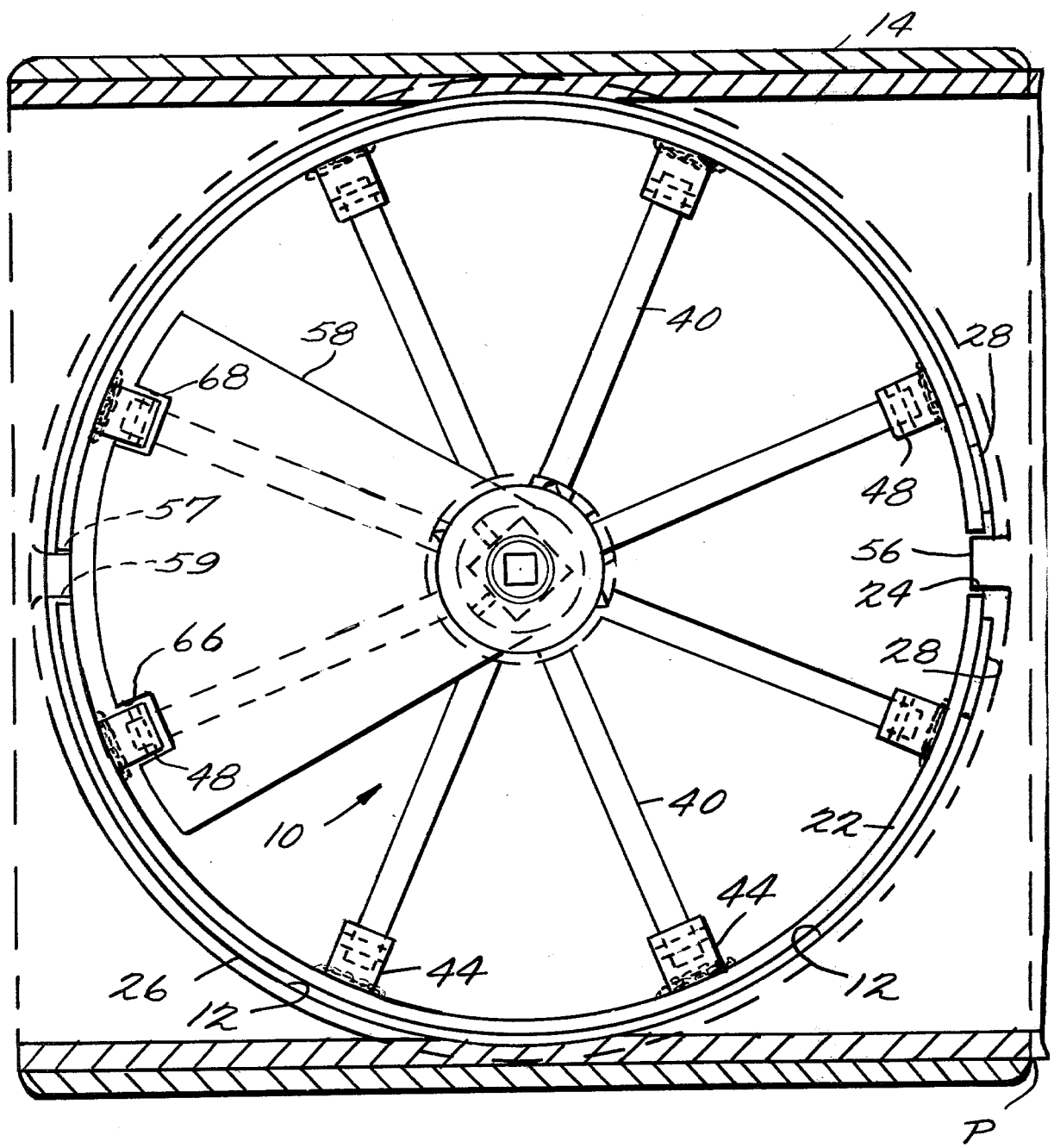
FIG. 2 is a top plan view of the stopper assembly inserted in a transverse opening in a pipeline, the pipeline and the pipeline fitting being shown in section.
Figure 3:
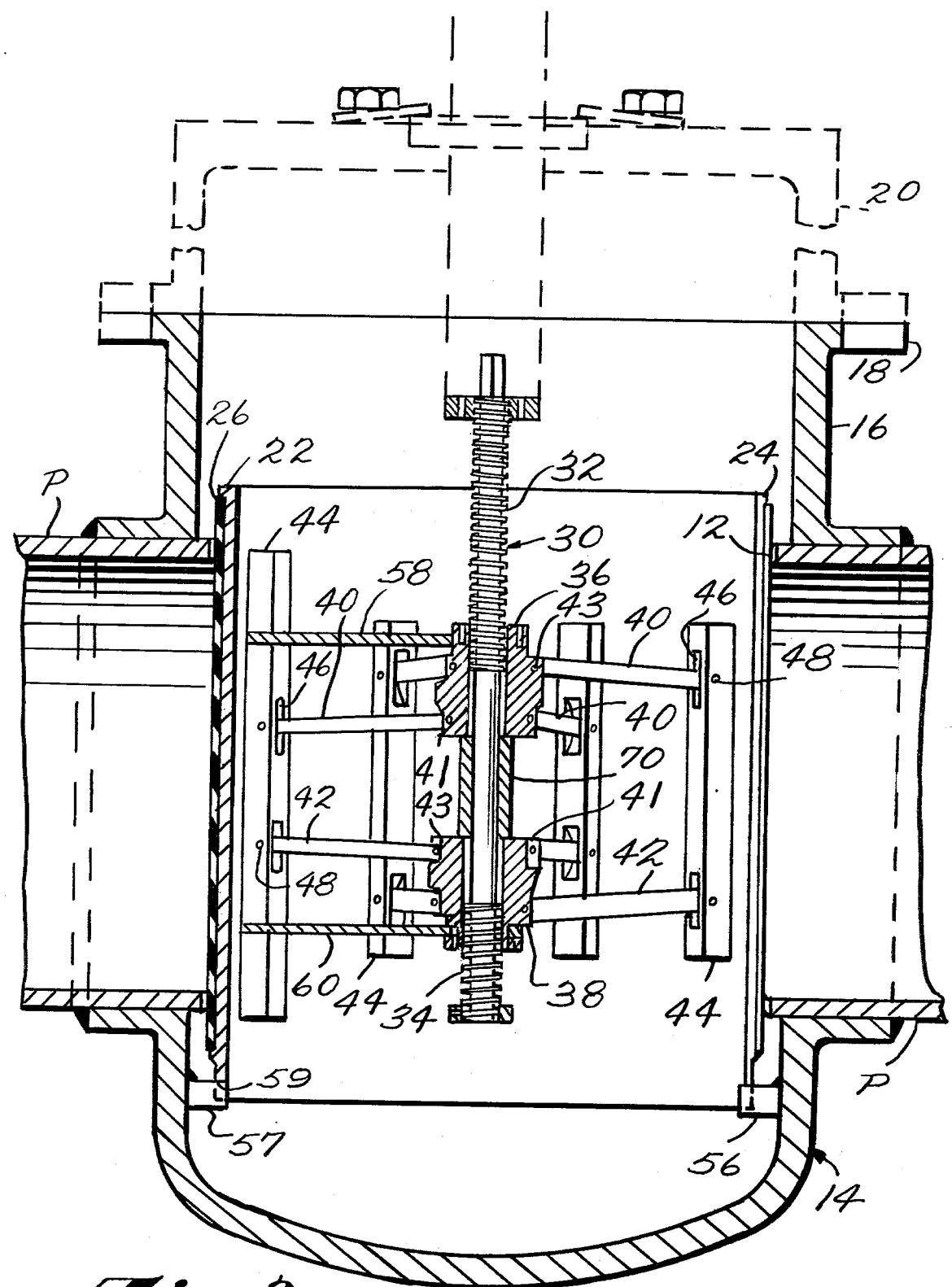
FIG. 3 is a vertical sectional view of the stopper assembly similar to FIG. 1 but showing the stopper assembly inserted into the opening of a pipeline with the split sleeve in the expanded position.

Referring specifically to FIGS. 2 and 3, it will be noted that the pipe fitting 14 in its tubular portion 16 is provided with radially inwardly extending lugs 56 and 57, the lugs 56 and 57 being located 180° apart and in a plane extending through the axis of the pipeline P and the vertical axis of the tubular portion 16 of the fitting 14. The lugs 56 and 57 cooperate respectively with the longitudinal space or slot 24 between the ends of the split cylindrical sleeve and a notch 59 in the sleeve disposed 180° opposite to the space or slot. The purpose of the lugs 56 and 57 is to have the one of them which engages the notch 59 ensure proper orientation of the longitudinal slot of the sleeve relative to the flow of fluid in the pipeline P dependent upon the particular use of the stopper assembly 10. Additionally, the lug engaging the notch 59 supports and prevents the sleeve 22 of the stopper assembly 10 from rotating relative to the opening 12 in the pipeline P when the stopper assembly 10 is expanded into sealing engagement with the edges of the opening 12. This eliminates the necessity of additional mechanisms on the stopper insertion machine 20 such as rods or the like for holding the sleeve 22 stationary during rotation of the jackscrew 32 to expand the same.

The stopper assembly 10 of the present invention is intended for use with large diameter pipelines such as pipelines 20 inches, 30 inches or even greater and, consequently, high torque loads and stresses are encountered during operation. In order to eliminate excess weight in the stopper assembly 10 by making the toggle arms 40 and 42 strong enough to assume all of the torque or stresses encountered during operation to expand the sleeve 22, sector-shaped torque plates 58 and 60 are respectively attached to the operating nuts 36 and 38 by means of retainer collars 62 and 64 suitably staked to the nuts by set screws or the like (not shown). The sector-shaped torque plates 58 and 60 are provided in their outer periphery with slots 66 and 68 which receive the upper and lower ends of at least two longitudinally extending bars 44. The bars 44, which are received in the slots 66 and 68, are provided with an extended length relative to the remaining bars 44 since the torque plates must engage the same throughout their entire vertical movement as viewed in the drawings when the operating nuts 36 and 38 are moved toward and away from one another. By such an arrangement as just previously described, torque created by the rotation of the jackscrew 30 and the movement of the nuts vertically on the jackscrew is transferred through the torque plates 58 and 60 to the longitudinal bars 44 and the split sleeve 22 rather than through the toggle arms 40 and 42 and, thus, the toggle arms 40 and 42 do not have to be made from heavier materials or stronger exotic and expensive metals since very little if any torque is transferred therethrough.

As shown in FIG. 1, a sleeve or collar 70 is loosely and coaxially mounted on the jackscrew 30, the collar directly engaging the lower operating nut 38 and being intermediate the two operating nuts 36 and 38. The collar or sleeve 70 has an axial length dimensioned so that the sleeve 70 will function or operate as a stop member when the stopper assembly 10 is expanded. Referring to FIG. 3, it will be noted that the sleeve 70 will engage the upper operating nut 36 as the two operating nuts 36 and 38 are moving toward one another and, thus, it stops their movement so that there cannot be over-travel of the toggle arms 40 and 42 to a position where the toggle arms swing past dead center and begin to contract the sleeve 22. The movement of arms 40 and 42 cannot be greater than 90° with respect to the axis of the jackscrew 30. By such an arrangement for directly limiting the movement of the operating nuts to control the pivoting of the arms, no unnecessary loads can be exerted on the pivot pins for the toggle arms as would be the case wherein stop means is provided for limiting movement of the toggle arms by engaging the toggle arm directly either at the connection of the arms to the sleeve or the connection of the arms to the operating nut members.

The terminology used in this specification is for the purpose of description and not limitation, the spirit and scope of the invention being defined in the appended claims.

What is claimed is:
1. In combination:
   a stopper fitting adapted to be secured around a pipeline, said fitting having a generally tubular portion extending transverse to an axis of the pipeline and through which a transverse circular opening is made in the pipeline, said stopper fitting having at least one inwardly extending lug adjacent one end thereof and positioned exterior of the transverse circular opening through the pipeline;

a cylindrical stopper assembly adapted to be inserted into the transverse circular opening of the pipeline, said stopper assembly comprising a longitudinally split expandable and contractible cylindrical sleeve having a gasket material on at least a portion of its outer surface, means on said split cylindrical sleeve cooperating with said at least one lug to axially position said split cylindrical sleeve in the transverse circular opening and to properly orient and prevent rotation of said sleeve with respect to said stopper fitting, said last mentioned means including a notch in the lower edge of said cylindrical sleeve for receiving said at least one lug, said stopper assembly further including means to expand said sleeve into sealing engagement with edges of opening in the pipeline and to contract said sleeve out of engagement, said means comprising a plurality of angularly spaced longitudinally extending bars secured to the inner surface of said sleeve, each of said bars having a slot adjacent each end thereof, a jackscrew, a pair of members threadedly connected to said jackscrew for movement toward and away from each other, a first set of angularly spaced toggle arms pivotally connected to one of said members and to said bars in the slots adjacent one end of the same; and a second set of angularly spaced toggle arms pivotally connected to the other of said members and to said bars in the slots at the other end of the same whereby movement of said members relative to each other expand and contract said sleeve, stop means slidably mounted on said jackscrew and loosely carried by one of said members for engaging the other of said members to thereby control maximum expansion of said cylindrical sleeve by limiting movement of said members toward each other and by limiting pivotal movement of said arms to an angle no greater than 90° to the longitudinal axis of said jackscrew, and means separate from said toggle arms and extending between at least one of said members and said bars and movable with said one member and relative to said bars for transferring torque from said members during operation directly to said longitudinally extending bars and said cylindrical sleeve without torque being transferred through said toggle arms.

2. The combination of claim 1 in which said at least one lug on said stopper fitting extends radially inwardly of said generally tubular portion and is located in a plane extending through the axis of the pipeline and the axis of the tubular portion.

3. The combination as claimed in claim 1 in which said stop means includes a sleeve carried on said jackscrew intermediate said members, said sleeve having an axial length less than a distance between said members when said split cylindrical sleeve is contracted.

4. The combination as claimed in claim 1 in which ends of said split sleeve define a space therebetween, and in which there are two oppositely disposed lugs in said fitting said notch being received in one of said lugs with the other of said lugs being positioned in said space.

5. In combination:

a stopper fitting adapted to be secured around a pipeline, said fitting having a generally tubular portion extending transverse to an axis of the pipeline and through which a transverse circular opening is made in the pipeline, said stopper fitting having at least one inwardly extending lug adjacent one end thereof and positioned exterior of the transverse circular opening through the pipeline;

a cylindrical stopper assembly adapted to be inserted into the transverse circular opening of the pipeline, said stopper assembly comprising a longitudinally split expandable and contractible cylindrical sleeve having a gasket material on at least a portion of its outer surface, means on said split cylindrical sleeve cooperating with said at least one lug to properly orient and prevent rotation of said sleeve with respect to said stopper fitting, said stopper assembly further including means to expand said sleeve into sealing engagement with edges of opening in the pipeline and to contract said sleeve out of engagement, said means comprising a plurality of angularly spaced longitudinally extending bars secured to the inner surface of said sleeve, each of said bars having a slot adjacent each end thereof, a jackscrew, a pair of members threadedly connected to said jackscrew for movement toward and away from each other, a first set of angularly spaced toggle arms pivotally connected to one of said members and to said bars in the slots adjacent one end of the same; and a second set of angularly spaced toggle arms pivotally connected to the other of said members and to said bars in the slots at the other end of the same whereby movement of said members relative to each other expand and contract said sleeve, stop means carried by one of said members for engaging the other of said members to thereby limit movement of said members toward each other and limit pivotal movement of said arms to an angle no greater than 90° to the longitudinal axis of said jackscrew, and means for transferring torque from said members during operation directly to said longitudinally extending bars and said cylindrical sleeve without torque being transferred through said toggle arms, said means for transferring torque from said members directly to said longitudinally extending bars including a sector-shaped torque plate secured to one member and slidably engaging at least two of said longitudinally extending bars and a second sector-shaped torque plate secured to the other member and also slidably engaging at least two of said longitudinally extending bars.

6. The combination as claimed in claim 5 wherein said stop means includes a sleeve carried on said jackscrew intermediate said members, said sleeve having an axial length less than a distance between said members when said split cylindrical sleeve is contracted.

7. The combination as claimed in claim 6 in which said at least one lug on said stopper fitting extends radially inwardly of said generally tubular portion and is located in a plane extending through the axis of the pipeline and the axis of the tubular portion.

8. In combination:

a stopper fitting adapted to be secured around a pipeline, said fitting having a generally tubular portion closed at one end and open at its other end, said tubular portion extending transverse to an axis of the pipeline and through which a transverse circular opening is made in the pipeline, said stopper fitting having at least one inwardly extending lug adjacent the closed end thereof and positioned exterior of the transverse circular opening through the pipeline;

a cylindrical stopper assembly adapted to be inserted through the open end of said tubular portion into the transverse circular opening of the pipeline, said stopper assembly comprising a longitudinally split expandable and contractible cylindrical sleeve having a gasket material on at least a portion of its outer surface, means on said split cylindrical sleeve cooperating with said at least one lug to axially position said split cylindrical sleeve in the transverse circular opening and to properly orient and prevent rotation of said sleeve with respect to said stopper fitting, and means on said stopper assembly for expanding said split cylindrical sleeve into sealing engagement with edges of the transverse circular openings through the pipeline, said means on said split cylindrical sleeve including a notch in the lower edge of said cylindrical sleeve for receiving said at least one lug.

9. The combination of claim 8 in which said at least one lug on said stopper fitting extends radially inwardly of said generally tubular portion of the fitting and is located in a plane extending through the axis of the pipeline and the axis of the tubular portion.

10. The combination as claimed in claim 8 in which ends of said split sleeve define a space therebetween, and in which there are two oppositely disposed lugs, one of said two lugs being received in said notch and the other of said two lugs being positioned in said space.

11. A cylindrical pipe stopper assembly adapted to be inserted into a transverse opening in a pipeline, said assembly comprising:

a longitudinally split cylindrical sleeve for insertion into the transverse opening through the pipeline, said sleeve being adapted to positively expand into sealing engagement with edges of the opening and positively contract out of sealing engagement;

an actuating means for positively expanding and contracting said sleeve, said actuating means including a member mounted for movement coaxially of the sleeve, a jackscrew threadedly engaged with said member for executing movement thereof, at least a pair of angularly spaced longitudinally extending bars secured to the inner surface of said longitudinally split cylindrical sleeve, each of said bars having a slot therein, at least a pair of angularly spaced toggle arms each pivotally connected to one of said bars in the slot therein and to said member, and means for transferring torque from said member during operation of the same directly to said longitudinally extending bars and said cylindrical sleeve without torque being transferred through said toggle arms, said means for transferring torque from said member directly to said longitudinally extending bars including a sector-shaped torque plate secured to said member for movement with the same and having slots therein for slidably engaging at least two of said longitudinally extending bars.

12. A cylindrical pipe stopper assembly adapted to be inserted into and having a minimum outer diameter less than a transverse circular opening through a pipeline, and adapted to be expanded into sealing engagement with the edges of the opening, said cylindrical pipe stopper assembly comprising:

a longitudinally split cylindrical sleeve having a gasket material on at least a portion of its outer surface, said sleeve further having a plurality of angularly spaced longitudinally extending bars secured to its inner surface, each of said bars having a slot adjacent each end thereof;

an elongated jackscrew;

a pair of members threadedly mounted on said jackscrew for movement toward and away from each other;

a first set of angularly spaced toggle arms pivotally connected to one of said members and to said bars in said slots adjacent one end of the same, and a second set of angularly spaced toggle arms pivotally connected to the other of said members and to said bars whereby movement of said members toward and away from each other respectively expands and contracts said sleeve;

a stop means slidably mounted on said jackscrew and loosely carried by one of said members for engaging the other of said members to thereby control maximum expansion of said sleeve by limiting movement of said members toward each other and by limiting pivotal movement of said arms to an angle no greater than 90° to the longitudinal axis of said jackscrew.

13. A cylindrical pipe stopper assembly as claimed in claim 12 in which said stop means includes a tubular sleeve carried on said jackscrew intermediate said members, said tubular sleeve having an axial length less than a distance between said members when said split cylindrical sleeve is in a contracted position.

14. A cylindrical pipe stopper assembly as claimed in claim 13 including means for transferring torque from at least one of said members during operation directly to said longitudinally extending bars and said cylindrical sleeve without torque being transferred through said toggle arms.

15. A cylindrical pipe stopper assembly adapted to be inserted into and having a minimum outer diameter less than a transverse circular opening through a pipeline, and adapted to be expanded into sealing engagement with the edges of the opening, said cylindrical pipe stopper assembly comprising:

a longitudinally split cylindrical sleeve having a gasket material on at least a portion of its outer surface, said sleeve further having a plurality of angularly spaced longitudinally extending bars secured to its inner surface, each of said bars having a slot adjacent each end thereof, an elongated jackscrew;

a pair of members threadedly mounted on said jackscrew for movement toward and away from each other;

a first set of angularly spaced toggle arms pivotally connected to one of said members and to said bars in said slots adjacent one end of the same, and a second set of angularly spaced toggle arms pivotally connected to the other of said members and to said bars whereby movement of said members toward and away from each other respectively expands and contracts said sleeve;

a stop means carried by one of said members for engaging the other of said members to thereby limit movement of said members toward each other and limit pivotal movement of said arms to an angle no greater than 90° to the longitudinal axis of said jackscrew, and means for transferring torque from at least one of said members during operation directly to said longitudinally extending bars and to said sleeve without torque being transferred through said toggle arms, said means for transferring torque including at least one sector-shaped torque plate secured to at least one of said members and having slots slidably engaging at least two of said longitudinally extending bars.

16. A cylindrical pipe stopper assembly adapted to be inserted into a transverse opening in a pipeline, said assembly comprising:

a longitudinally split cylindrical sleeve for insertion into the transverse opening through the pipeline, said sleeve being adapted to positively expand into sealing engagement with edges of the opening and positively contract out of sealing engagement;

an actuating means for positively expanding and contracting said sleeve, said actuating means including a member mounted for movement coaxially of the sleeve, a jackscrew threadedly engaged with said member for executing movement thereof, at least a pair of angularly spaced longitudinally extending bars secured to the inner surface of said longitudinally split cylindrical sleeve, each of said bars having a slot therein, at least a pair of angularly spaced toggle arms each pivotally connected to one of said bars in the slot therein and to said member, and means separate from said toggle arms and extending between said member and said bars and movable with said member and relative to said bars for transferring from said member during operation of the same directly to said longitudinally extending bars and said cylindrical sleeve without torque being transferred through said toggle arms.

17. The stopper fitting as claimed in claim 16 in which there is a second member threadedly mounted on said jackscrew for movement toward and away from said first-mentioned member and in which there is a second set of angularly spaced toggle arms pivotally connected to said second member and to said bars, and in which said means for transfering torque from said members directly to said longitudinally extending bars includes a sector-shaped torque plate secured to said first member and having slots therein for slidably engaging at least two of said longitudinally extending bars and a second sector-shaped torque plate secured to said second member and also having slots therein for slidably engaging at least two of said longitudinally extending bars.

* * * * *